US010638300B2

(12) United States Patent
Yu

(10) Patent No.: US 10,638,300 B2
(45) Date of Patent: Apr. 28, 2020

(54) METHOD AND DEVICE FOR ENABLING PLURALITY OF MOBILE PHONES TO SHARE ONE SIM CARD

(71) Applicant: ZTE CORPORATION, Shenzhen (CN)

(72) Inventor: Weina Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 103 days.

(21) Appl. No.: 15/538,812

(22) PCT Filed: May 8, 2015

(86) PCT No.: PCT/CN2015/078587
§ 371 (c)(1),
(2) Date: Jun. 22, 2017

(87) PCT Pub. No.: WO2016/101489
PCT Pub. Date: Jun. 30, 2016

(65) Prior Publication Data
US 2019/0104396 A1    Apr. 4, 2019

(30) Foreign Application Priority Data

Dec. 22, 2014  (CN) .......................... 2014 1 0810811

(51) Int. Cl.
*H04W 8/00*    (2009.01)
*H04W 12/04*   (2009.01)
(Continued)

(52) U.S. Cl.
CPC ............. *H04W 8/005* (2013.01); *H04W 4/80* (2018.02); *H04W 8/205* (2013.01); *H04W 12/02* (2013.01);
(Continued)

(58) Field of Classification Search
CPC ..... H04W 8/005; H04W 12/02; H04W 12/06; H04W 4/80; H04W 88/06; H04W 8/205; H04W 12/04; H04W 12/00403
See application file for complete search history.

(56) References Cited

U.S. PATENT DOCUMENTS

2004/0042442 A1*  3/2004  Pecen ................... H04W 12/04
                                                         370/352
2005/0255885 A1   11/2005  Majewski et al.
(Continued)

FOREIGN PATENT DOCUMENTS

CN    101742731 A    6/2010
CN    103428250 A   12/2013
(Continued)

OTHER PUBLICATIONS

PCT International Search Report dated Sep. 24, 2015, Application No. PCT/CN2015/078587, 3 Pages.
(Continued)

*Primary Examiner* — Afshawn M Towfighi

(57) ABSTRACT

A method and apparatus for realizing a plurality of mobile phones to share one card are provided. The method applied to a first terminal equipment side includes: through a Bluetooth module of a first terminal equipment, searching for one or more second terminal equipments nearby, or receiving information for searching for the first terminal equipment by one or more second terminal equipments, establishing a connection between Bluetooth modules of both terminal equipments; sending subscriber identification module information of the first terminal equipment to the Bluetooth module of the second terminal equipment through the Bluetooth module of the first terminal equipment, and storing subscriber identification module information in a fixed storage area of the second terminal equipment by the second terminal equipment. By binding searched second and first
(Continued)

terminal equipment by the Bluetooth technology, the subscriber identification module information of the first terminal equipment is transmitted to the second terminal equipment.

10 Claims, 5 Drawing Sheets

(51) Int. Cl.
    *H04W 8/20*     (2009.01)
    *H04W 88/06*     (2009.01)
    *H04W 12/02*     (2009.01)
    *H04W 4/80*     (2018.01)
    *H04W 12/06*     (2009.01)
    *H04W 12/00*     (2009.01)

(52) U.S. Cl.
    CPC ........... *H04W 12/04* (2013.01); *H04W 12/06* (2013.01); *H04W 88/06* (2013.01); *H04W 12/00403* (2019.01)

(56) References Cited

U.S. PATENT DOCUMENTS

2008/0175211 A1*   7/2008   Hansen ................. H04W 12/02
                                                             370/338
2013/0210461 A1*   8/2013   Moldavsky ........ G06Q 30/0261
                                                             455/456.3
2015/0350812 A1*  12/2015   Hu ................... H04M 1/274516
                                                              455/41.1

FOREIGN PATENT DOCUMENTS

| | | |
|---|---|---|
| CN | 103955739 A | 7/2014 |
| EP | 1895790 A1 | 3/2008 |
| WO | 03105508 A1 | 12/2003 |
| WO | 2005/036822 A1 | 4/2005 |

OTHER PUBLICATIONS

Extended European Search Report dated Dec. 18, 2017 for European Patent Application No. 15871565.6.

* cited by examiner

METHOD AND DEVICE FOR ENABLING PLURALITY OF MOBILE PHONES TO SHARE ONE SIM CARD

CROSS-REFERENCE TO RELATED APPLICATIONS

This application is a U.S. national phase of PCT Application No. PCT/CN2015/078587 filed on May 8, 2015, which claims priority to Chinese Patent Application No. 201410810811.8 filed on Dec. 22, 2014, the disclosures of which are incorporated in their entirety by reference herein.

TECHNICAL FIELD

Embodiments of the present disclosure relate to the field of communication technology, and in particular, to a method and apparatus for realizing a plurality of mobile phones to share one SIM card.

BACKGROUND

There are a variety of technologies similar to the "a plurality of mobile phones to share one card" function in the existing art, and these existing technologies have some disadvantages, the specific analyses of which are as follows.

For copying of an SIM card: the owner user of the mobile phone often receives a short message similar to "My department can produce a phone number same as a phone number of other people for you, and with it you can listen to his conversation, see a message sent by him, and find where he is. That is, his tracks are in your control." or the like. First it is noted that, it is impossible to realize copying in this case of only a phone number but no SIM card. Whereas, in the case of an SIM card, an SIM card produced by an operator a few years ago is easy to be copied. However, at present, a new SIM has an anti-copy function, but the business hall also provides card-copy function, and one card is used for calling, and another card is used for surfing the Internet. However, with this technology, the two cards cannot be used at the same time, and when receiving a call, the ringing mobile phone is random. As the operating principle that the base station only records the last state of the mobile phone, the situation that the copy card can receive short messages and calls sometimes, but sometimes cannot receive the messages and calls (can make a call simultaneously) will occur. The card which accesses behind is used as an online card, and all received calls and short messages will be sent to a mobile phone where the card is located. In other words, for one International Mobile Subscriber Identification Number (IMSI), only one card can be online. For example, if the copy card is used at last, and a mobile phone where the copy card is located is powered off now, then even a mobile phone where the original card is located is on, when calling the card number, you will be prompted that the mobile phone which you called is powered off. Unless the mobile phone where the original card is located calls a phone number or sends a short message at once, the base station will know that the current state of the mobile phone is on and online. In addition, answering a call at the same time by multiple parties is impossible completely, and only calls and short messages can be received at best. Even if the card is copied, only one card is in online state. Only one mobile phone can be used at the same time. In conclusion, the technology has following disadvantages:

(1) In the case of no SIM card, copying of an SIM card cannot be performed.

(2) A mobile phone Subscriber Identify Model produced by an operator has the anti-copy function, thus the copying is not easy and consumes for a longer time; it is more cumbersome when copying in the business hall; and a physical card of the mobile phone is required, which increases cost.

(3) Since only one of the copy card and the original card can be online, a function of the conference call cannot be implemented.

(4) The copy card can only receive calls and short messages and has less functions, therefore the copy card has no market value.

Similarly, the other technologies which realize "a plurality of mobile phones to share one card" have a situation that "requiring to copy the mobile phone card in the business hall". Such a way really increases the difficulty, and not only wastes the consumer's time, but also increases the workload of the staff. Also due to this reason, the existing technologies which realize "a plurality of mobile phones to share one card" have not been widely applied.

SUMMARY

To solve the above-mentioned technical problems, embodiments of the present disclosure provide a method and apparatus for realizing a plurality of mobile phones to share one card, which can realize a plurality of mobile phones to share one card really, and can be operated simply, and have a better user experience value.

To achieve the above-mentioned object, an embodiment of the present disclosure provides a method for realizing a plurality of mobile phones to share one card, applied to a first terminal equipment side, and the method includes:

through a Bluetooth module of a first terminal equipment, searching for one or more second terminal equipments nearby, or t receiving information for searching for the first terminal equipment by a Bluetooth module/modules of one or more second terminal equipment;

establishing a connection between the Bluetooth module of the first terminal equipment and a Bluetooth module of a second terminal equipment; and sending subscriber identification module information of the first terminal equipment to the Bluetooth module of the second terminal equipment through the Bluetooth module of the first terminal equipment, and storing the subscriber identification module information in a fixed storage area of the second terminal equipment by the second terminal equipment.

In an exemplary embodiment, the method further includes: acquiring Bluetooth buffer parameter information of the Bluetooth module of the first terminal equipment.

In an exemplary embodiment, establishing a connection between the Bluetooth module of the first terminal equipment and a Bluetooth module of a second terminal equipment includes:

sending connection request information to the Bluetooth module of the second terminal equipment through the Bluetooth module of the first terminal equipment; herein, the connection request information includes connection parameter information, such as a Bluetooth address, an equipment type, and a connection mode, of the first terminal equipment; and through the Bluetooth module of the second terminal equipment, receiving the connection request information and sending an instruction, and establishing the connection between the Bluetooth module of the first terminal equipment and the Bluetooth module of the second terminal equipment.

In an exemplary embodiment, sending subscriber identification module information of the first terminal equipment to the Bluetooth module of the second terminal equipment through the Bluetooth module of the first terminal equipment includes:

splitting, by the first terminal equipment, the subscriber identification module information, which is sent to the Bluetooth module of the second terminal equipment, based on the Bluetooth buffer parameter; and defining the split subscriber identification module information in a Bluetooth data package format, and identifying by a data package header, and sending the identified subscriber identification module information to the Bluetooth module of the second terminal equipment through the Bluetooth module of the first terminal equipment.

An embodiment of the present disclosure further provides a method for realizing a plurality of mobile phones to share one card, applied to a second terminal equipment side, and the method includes:

through a Bluetooth module of a second terminal equipment, receiving searching information sent by a Bluetooth module/modules of one or more first terminal equipments, or searching for one or more first terminal equipments nearby;

establishing a connection between the Bluetooth module of the second terminal equipment and a Bluetooth module of a first terminal equipment;

receiving subscriber identification module information of the first terminal equipment sent by the Bluetooth module of the first terminal equipment through the Bluetooth module of the second terminal equipment, and storing the subscriber identification module information in a fixed storage area of the second terminal equipment; and performing, by the second terminal equipment, a number-card authentication based on the subscriber identification module information stored in the fixed storage area.

In an exemplary embodiment, establishing a connection between the Bluetooth module of the second terminal equipment and a Bluetooth module of a first terminal equipment includes:

sending connection request information to the Bluetooth module of the first terminal equipment through the Bluetooth module of the second terminal equipment; herein, the connection request information includes connection parameter information, such as a Bluetooth address, an equipment type, and a connection mode, of the second terminal equipment; and through the Bluetooth module of the first terminal equipment, receiving the connection request information and sending an instruction, and establishing the connection between the Bluetooth module of the second terminal equipment and the Bluetooth module of the first terminal equipment.

In an exemplary embodiment, receiving subscriber identification module information of the first terminal equipment sent by the Bluetooth module of the first terminal equipment through the Bluetooth module of the second terminal equipment, and storing the subscriber identification module information in a fixed storage area of the second terminal equipment includes:

receiving, by the Bluetooth module of the second terminal equipment, a plurality of pieces of split subscriber identification module information sent by the Bluetooth module of the first terminal equipment, and reassembling the split information of the subscriber identification module information; and storing, by the second terminal equipment, the reassembled subscriber identification module information in the fixed storage area.

An embodiment of the present disclosure provides an apparatus for realizing a plurality of mobile phones to share one card, applied to a first terminal equipment side, and the apparatus includes:

a first searching module configured to, through a Bluetooth module of a first terminal equipment, search for one or more second terminal equipments nearby, or receive information for searching for the first terminal equipment by a Blue module/modules of one or more second terminal equipments;

a first connection module configured to establish a connection between the Bluetooth module of the first terminal equipment and a Bluetooth module of a second terminal equipment; and a first processing module configured to send subscriber identification module information of the first terminal equipment to the Bluetooth module of the second terminal equipment through the Bluetooth module of the first terminal equipment, and store the subscriber identification module information in a fixed storage area of the second terminal equipment by the second terminal equipment.

In an exemplary embodiment, the apparatus further includes an acquisition module configured to acquire Bluetooth buffer parameter information of the Bluetooth module of the first terminal equipment.

In an exemplary embodiment, the first connection module includes:

a first sending unit configured to send connection request information to the Bluetooth module of the second terminal equipment through the Bluetooth module of the first terminal equipment, herein the connection request information includes connection parameter information, such as a Bluetooth address, an equipment type and a connection mode, of the first terminal equipment; and a first connection unit configured to, through the Bluetooth module of the second terminal equipment, receive the connection request information and send an instruction, and establish the connection between the Bluetooth module of the first terminal equipment and the Bluetooth module of the second terminal equipment.

In an exemplary embodiment, the first processing module includes:

a splitting unit configured to split the subscriber identification module information, which is sent to the Bluetooth module of the second terminal equipment, based on the Bluetooth buffer parameter; and a first processing unit configured to define the split subscriber identification module information in a Bluetooth data package format, and identify by a data package header, and send the identified subscriber identification module information to the Bluetooth module of the second terminal equipment through the Bluetooth module of the first terminal equipment.

An embodiment of the present disclosure further provides an apparatus for realizing a plurality of mobile phones to share one card, applied to a second terminal equipment side, and the apparatus includes:

a second searching module configured to, through a Bluetooth module of a second terminal equipment, receive searching information sent by a Bluetooth module/modules of one or more first terminal equipments, or search for one or more first terminal equipments nearby;

a second connection module configured to establish a connection between the Bluetooth module of the second terminal equipment and a Bluetooth module of a first terminal equipment;

a second processing module configured to receive subscriber identification module information of the first terminal equipment sent by the Bluetooth module of the first terminal equipment through the Bluetooth module of the second terminal equipment, and store the subscriber identification module information in a fixed storage area of the second terminal equipment; and an authentication module configured to perform a number-card authentication based on the subscriber identification module information stored in the fixed storage area.

In an exemplary embodiment, the second connection module includes:

a second sending unit configured to send connection request information to the Bluetooth module of the first terminal equipment through the Bluetooth module of the second terminal equipment, herein the connection request information includes connection parameter information, such as a Bluetooth address, an equipment type and a connection mode, of the second terminal equipment; and a second connection unit configured to, through the Bluetooth module of the first terminal equipment, receive the connection request information and send an instruction, and establish the connection between the Bluetooth module of the second terminal equipment and the Bluetooth module of the first terminal equipment.

In an exemplary embodiment, the second processing module includes:

a second processing unit configured to receive a plurality of pieces of split subscriber identification module information sent by the Bluetooth module of the first terminal equipment through the Bluetooth module of the second terminal equipment, and reassemble the split subscriber identification module information; and a storage unit configured to store the reassembled the subscriber identification module information in the fixed storage area.

According to the technical scheme provided by the embodiments of the present disclosure, through a Bluetooth module of a first terminal equipment, one or more second terminal equipments nearby is/are searched for, or information for searching for the first terminal equipment by one or more second terminal equipments is received, and a connection with the second terminal equipment is established and the subscriber identification module information is sent to the second terminal equipment. Therefore, a plurality of mobile phones to share one card is realized really and the operation is simple, and it is convenient for the replacement of a new terminal equipment and an old terminal equipment and for user experience. While the operation is simple, there is a higher security also.

BRIEF DESCRIPTION OF THE DRAWINGS

The drawings described here are used for providing further understanding about the present disclosure and constitute a part of the present disclosure. The exemplary embodiments of the present disclosure and the description thereof are used for explaining the present disclosure instead of improperly limiting the present disclosure. In the drawings.

DETAILED DESCRIPTION

To make purposes, technical solutions and advantages of the embodiments of the present disclosure clearer, embodiments of the present disclosure will be described in detail in conjunction with the accompanying drawings as below. It should be illustrated that, under the situation of no conflict, the embodiments and the features of the embodiments in the present application can be freely combined with each other.

Figure 1:
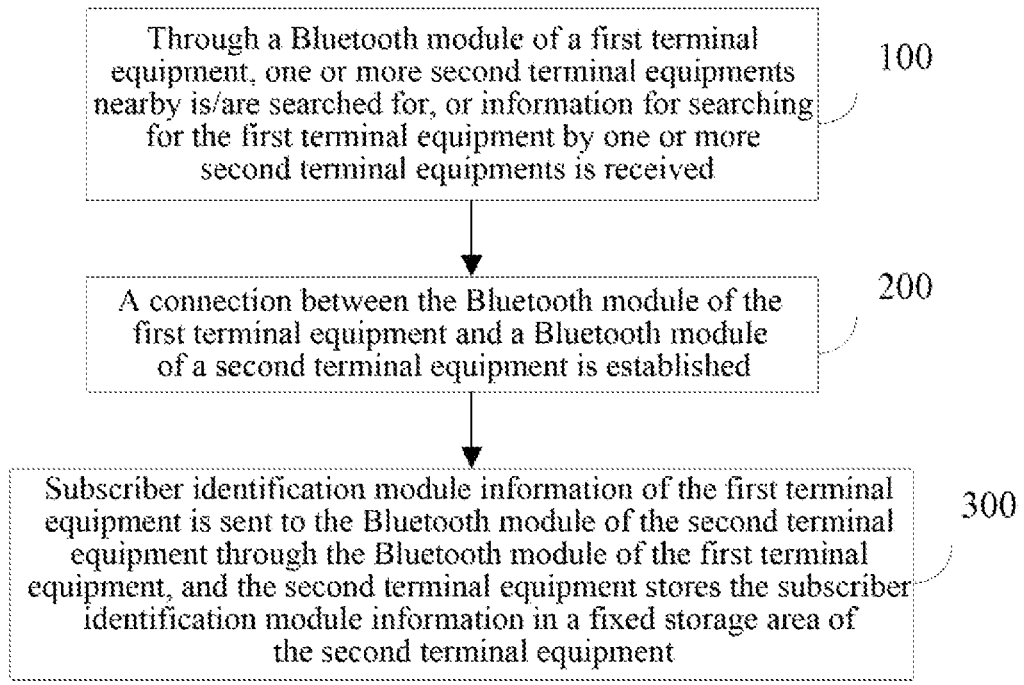
FIG. 1 is a flow chart of a method for realizing a plurality of mobile phones to share one card, applied to a first terminal equipment side, according to an embodiment of the present disclosure.

As shown in FIG. 1, an embodiment of the present disclosure provides a method for realizing a plurality of mobile phones to share one card, applied to a first terminal equipment side, and the method includes steps 100-300.

In step 100, through a Bluetooth module of a first terminal equipment, one or more second terminal equipments nearby is/are searched for, or information for searching for the first terminal equipment by one or more second terminal equipments is received.

In step 200, a connection between the Bluetooth module of the first terminal equipment and a Bluetooth module of a second terminal equipment is established.

In step 300, subscriber identification module information of the first terminal equipment is sent to the Bluetooth module of the second terminal equipment through the Bluetooth module of the first terminal equipment, and the second terminal equipment stores the subscriber identification module information in a fixed storage area of the second terminal equipment.

It should be illustrated that the subscriber identification module is an SIM card, a USIM card, an ISIM card, a Nano-SIM card or a UIM card. When using the Bluetooth technology to communicate, in each pair of equipments, there must be a main role, i.e., a master terminal, and a slave role, i.e., a slave terminal to communicate. When communicating, searching must be performed by the main terminal and pairing must be initiated by the main terminal, and after a connection is established successfully, the two terminals can send and receive data. In theory, a Bluetooth master terminal equipment can communicate with seven Bluetooth slave terminal equipments at the same time. In a slave mode, a Bluetooth slave terminal equipment waits for other master equipments to connect, and when necessary, it is converted to a master mode and initiates a call to other equipments. When initiating a call in the master mode, a Bluetooth equipment requires to know a Bluetooth address, pairing password, etc. of its party, and after a paring is completed, the Bluetooth equipment may initiate the call directly.

Specifically, the Bluetooth module of the first terminal equipment performs an inquiry on the second terminal equipment nearby. In case of no response to the inquiry, the first terminal equipment gets into a state of waiting for a connection request from the second terminal equipment. First, the first terminal equipment scans once to find a second terminal equipment within a valid range, thereby determining the state which the first terminal equipment should be in. The first terminal equipment will perform a further state setting after starting the scan this time. An inquiry instruction issued when inquiring leads the first terminal equipment to get into a state of finding a second terminal equipment nearby. The main parameters of the inquiry instruction include an inquiry interval and the number of responses. Herein, if the second terminal equipment is found, the first terminal equipment is set as the master equipment and sends a connection request; if the second terminal is not found, after the query interval is exceeded, the first terminal equipment is set as the slave equipment and gets into a state of regularly inquiring, and waiting for a connection request from the second terminal equipment as a master equipment. Parameters of regular inquiry include an inquiry interval, time of each inquiry, and the number of equipments that are allowed to respond.

In the above-mentioned embodiment of the present disclosure, before the first terminal equipment searches for the second terminal equipment nearby, or receives the searching information from the second terminal equipment, the method further includes: acquiring Bluetooth buffer parameter information of the Bluetooth module of the first terminal equipment.

Specifically, the related description is as follows. Initialization of the first terminal equipment includes initialization of the Bluetooth module and setting of an initial state of the first terminal equipment. After a physical connection of the first terminal equipment is completed, the driver is automatically loaded and starts the initialization. The first terminal equipment is reset first, and the driver issues a reset instruction to the Bluetooth module to reset the Bluetooth module, and the Bluetooth module completes the reset operation after receiving the reset instruction, and returns an instruction completion event to the first terminal equipment to inform of reset completion. After receiving a reset completion event, the first terminal equipment reads and saves information of the Bluetooth module; herein the information of the Bluetooth module includes version information, a Bluetooth address and a Bluetooth buffer parameter. Herein, the Bluetooth address is used for a connection operation, and the Bluetooth address is set when the Bluetooth module leaves a factory, and the Bluetooth buffer parameters will be submitted to the first terminal equipment so that the first terminal equipment splits the data to be sent into blocks. The first terminal equipment then makes a preliminary setting of the Bluetooth module. With the reset instruction, the buffer size parameter of the first terminal equipment is passed to the Bluetooth module, and the first terminal equipment uses the information to control the data transmission. Setting for a timer includes a value, an interval, etc. of the time of inquiry, and the Bluetooth module acquiescently sets common information which is not modified when there is no particular requirement in actual application. But the setting for the timer requires to be read by relevant instructions and saved by the first terminal equipment for ease of use.

Figure 2:
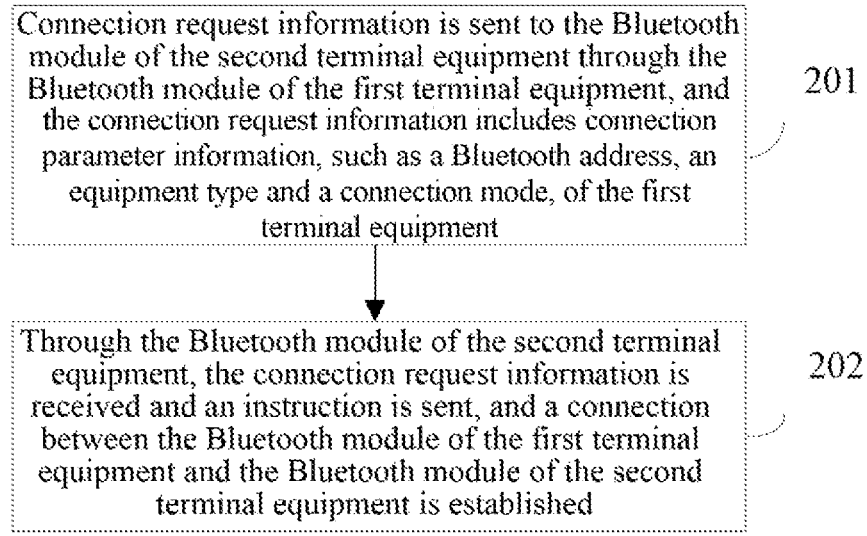
FIG. 2 is a flow chart of establishing a connection between a Bluetooth module of a second terminal equipment and a Bluetooth module of a first terminal equipment in the method for realizing a plurality of mobile phones to share one card, applied to the first terminal equipment side, according to an embodiment of the present disclosure.

In the above-mentioned embodiment of the present disclosure, as shown in FIG. 2, the step 200 specifically includes steps 201-202.

In step 201, connection request information is sent to the Bluetooth module of the second terminal equipment through the Bluetooth module of the first terminal equipment, and the connection request information includes connection parameter information, such as a Bluetooth address, an equipment type, and a connection mode, of the first terminal equipment.

In step 202, through the Bluetooth module of the second terminal equipment, the connection request information is received and an instruction is sent, and the connection between the Bluetooth module of the first terminal equipment and the Bluetooth module of the second terminal equipment is established.

Specifically, pairing information between two Bluetooth modules is set in advance before the Bluetooth module leaves the factory. The main terminal pre-stores a PIN code (personal identification password of the subscriber identification module), address, etc. of the slave terminal equipment. A connection is established automatically when both of the terminal equipments are powered on, and the transmission is performed through a serial port without an intervention from a peripheral circuit. In one-to-one application, the slave terminal equipment may be set as two states, and one is silent state, that is, the slave terminal equipment can only communicate with a designated master terminal but cannot be found by other Bluetooth modules; another one of the two states is development state, that is, the slave terminal equipment can be not only found by the designated master terminal, but also found by other Bluetooth modules to establish a connection.

The first terminal equipment as the master equipment sends the connection request to the second terminal equipment, and the Bluetooth module of the second terminal equipment sends a connection request event to the second terminal equipment after receiving the connection request. The connection request event includes connection parameters such as the Bluetooth address, the equipment type, and the connection mode, of the first terminal equipment. The second terminal equipment receives the connection request from the first terminal equipment and sends an instruction, and designates its own role with a parameter. After the instruction is issued, both the first terminal equipment and the second terminal equipment receive a connection completion event which includes the Bluetooth address, the connection mode, an encryption mode and a connection handle of the party. Herein, the connection handle is the "Name" of the connection, and an operation of the connection is performed by referencing the connection handle. In this way, the connection between the first terminal equipment and the second terminal equipment is established, and data transmission can be performed. Interruption of the connection is relatively simple. Once either party sends an interruption instruction, the connection is interrupted. The interruption instruction has a parameter to indicate which connection is interrupted. After transmission operation for the current data is completed, both the first terminal equipment and the second terminal equipment receive an interruption connection event with a connection handle.

After the connection is established successfully, the first terminal equipment and the second terminal equipment may perform bidirectional data or voice communication. Also, the Bluetooth module of the second terminal equipment may record information of the second terminal equipment, and at this time the first terminal equipment may initiate a call to the second terminal equipment. In the present disclosure, the call is a data link call, and paired equipments do not require to be repaired any longer when making a call next time.

Figure 3:
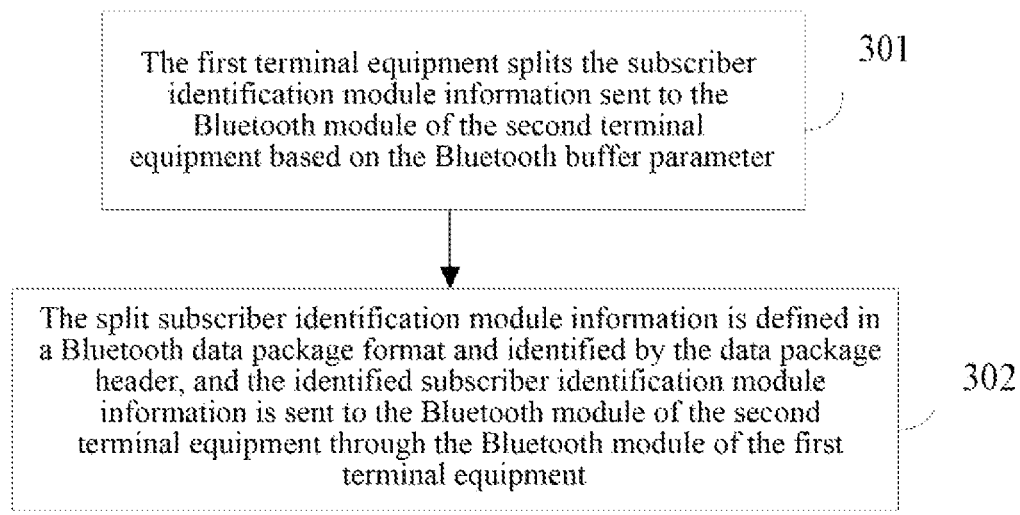
FIG. 3 is a flow chart of sending subscriber identification module information in the method for realizing a plurality of mobile phones to share one card, applied to the first terminal equipment side, according to an embodiment of the present disclosure.

In the above-mentioned embodiment of the present disclosure, as shown in FIG. 3, the step 300 includes steps 301-302.

In step 301, the first terminal equipment splits the subscriber identification module information, which is sent to the Bluetooth module of the second terminal equipment, based on the Bluetooth buffer parameter.

In step 302, the split subscriber identification module information is defined in a Bluetooth data package format and identified by a data package header, and the identified subscriber identification module information is sent to the Bluetooth module of the second terminal equipment through the Bluetooth module of the first terminal equipment.

It should be illustrated that after the first terminal equipment splits the subscriber identification module information to be sent, the Bluetooth module of the first terminal equipment may determine the number of times for the split subscriber identification module information to arrive at the Bluetooth module based on the buffer size parameter of the first terminal equipment acquired previously.

Specifically, after the connection of the system is established, the data transmission is relatively simple. As a communication channel has been established, it is only required that data to be sent are sent to a USB bus. An important part of the data transmission is to group the data to be transmitted to fit a size of a Bluetooth buffer, which is based on a value of the read Bluetooth buffer parameter. The split data also adds a data package header based on the definition of the Bluetooth data package format, so that the Bluetooth module correctly identify and process the split data. After processed according to a Bluetooth data package format, the data to be sent are then combined into a larger data block. Another important part of the data transmission is to program for the USB bus. A USB driver does not dialogue directly with a hardware, but completes an operation on the hardware by creating a USB Request Block (URB) and submitting the URB to the bus driver (USBD-.SYS). The data on which package processing is performed receives the URB, and invoking of the URB by the driver is converted into a code with a main function to complete a designated operation. Thus, the driver first creates a URB according to a rule in a DDK (Device Development Kit). After created, the URB may be configured to interact with the USBD.SYS. Of course, in this design, the data may also be transmitted directly by an RS232 serial port to complete the data transmission and may not use a USB interface at all.

Figure 4:
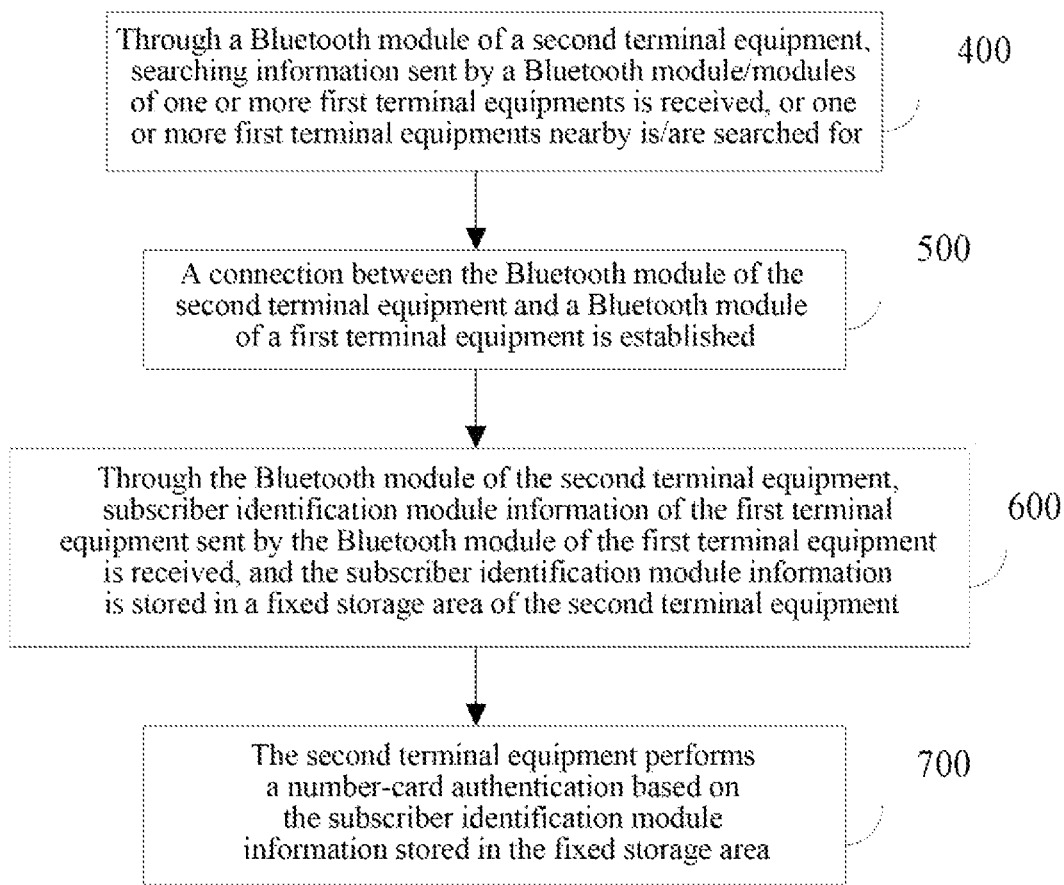
FIG. 4 is a flow chart of a method for realizing a plurality of mobile phones to share one card, applied to a second terminal equipment side, according to an embodiment of the present disclosure.

An embodiment of the present disclosure further provides a method for realizing a plurality of mobile phones to share one card, applied to a second terminal equipment side, and as shown in FIG. 4, the method includes steps 400-700.

In step 400, through a Bluetooth module of a second terminal equipment, searching information sent by a Bluetooth module/modules of one or more first terminal equipments is received, or one or more first terminal equipments nearby is/are searched for.

In step 500, a connection between the Bluetooth module of the second terminal equipment and a Bluetooth module of a first terminal equipment is established.

In step 600, through the Bluetooth module of the second terminal equipment, subscriber identification module information of the first terminal equipment sent by the Bluetooth module of the first terminal equipment is received, and the subscriber identification module information is stored in a fixed storage area of the second terminal equipment.

In step 700, the second terminal equipment performs a number-card authentication based on the subscriber identification module information stored in the fixed storage area.

Specifically, the second terminal equipment receives and stores the subscriber identification module information sent by the first terminal equipment. However, the current problem is that where the subscriber identification module information is stored in the second terminal equipment, which should refer to a form of integration of a mobile phone with an SIM card in early years. When there was no concept of the subscriber identification module, that is, a mobile phone can match a phone number of mobile phone only when designated data was written in a certain storage area in the mobile phone, for example, an analog cellular phone in early years used this form; a later Personal Handy-phone System (PHS) phone used once in this way also. The current plurality of mobile phones to share one card may use such a way, that is, the current plurality of mobile phones to share one card may write the subscriber identification module information of the first terminal equipment, such as a user identity authentication, a data information storage, and information relevant to value-added service provided by SIM Tool Kit (STK), in a certain fixed storage area of the second terminal equipment to realize a binding function of the first terminal equipment and the second terminal equipment.

For an authentication operation of the subscriber identification module, the code IMSI and the key Ki are confidential data that need to be stored securely. For an authentication for a user, a random number RAND is generated from a network side, and an authentication result SRES and a call encryption key Kc are calculated by using the IMSI and the key Ki stored in the subscriber identification module.

If the SRES calculated by the subscriber identification module is the same as an SRES calculated in the network, the authentication is successful. Since a user of a mobile phone may roam, the main network units involved in authentication include a Visited Location Register (VLR), a Mobile Switching Center (MSC), a Home Registration Register (HLR) and an Authentication Center (AUC).

When powered on, the mobile phone reads a series of service information stored in the subscriber identification module, and then performs an authentication for login. If the authentication succeeds, the name of current operator will be displayed. At this moment the user may perform a normal operation. Moreover, the mobile phone sends an inquiry instruction in a certain time interval to check the current state of the subscriber identification module, and once finding that the subscriber identification module does not return a correct response, then the mobile phone cuts off the connection to network and prompts to insert the subscriber identification module. After a mobile phone has the binding function, when a mobile phone performs the inquiry, it is required to include inquiring a part of SIM information written in a fixed storage of the mobile phone.

Figure 5:
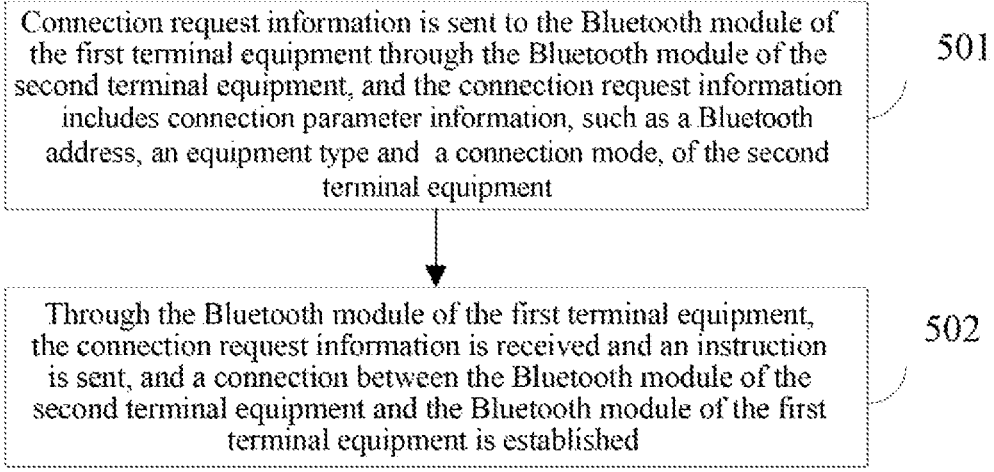
FIG. 5 is a flow chart of establishing a connection between a Bluetooth module of a first terminal equipment and a Bluetooth module of a second terminal equipment in the method for realizing a plurality of mobile phones to share one card, applied to the second terminal equipment side, according to an embodiment of the present disclosure.

In the above-mentioned embodiment of the present disclosure, as shown in FIG. 5, the step 500 specifically includes steps 501-502.

In step 501, connection request information is sent to the Bluetooth module of the first terminal equipment through the Bluetooth module of the second terminal equipment, and the connection request information includes connection parameter information, such as a Bluetooth address, an equipment type and a connection mode, of the second terminal equipment.

In step 502, through the Bluetooth module of the first terminal equipment, the connection request information is received and an instruction is sent, and the connection between the Bluetooth module of the second terminal equipment and the Bluetooth module of the first terminal equipment is established.

The second terminal equipment as the master equipment sends a connection request to the first terminal equipment, and the Bluetooth module of the first terminal equipment sends a connection request event to the first terminal equipment after receiving the connection request. The connection request event includes connection parameters such as the Bluetooth address, the equipment type, and the connection mode, of the second terminal equipment. The first terminal equipment receives the connection request from the second terminal equipment and sends an instruction, and designates its own role with a parameter. After the instruction is issued, both the second terminal equipment and the first terminal equipment receive a connection completion event, which includes the Bluetooth address, the connection mode, an encryption mode and a connection handle of the party. Herein, the connection handle is the "Name" of the connection, and an operation of the connection is performed by referencing the connection handle. In this way, the connection between the second terminal equipment and the first terminal equipment is established, and data transmission can be performed. Interruption of the connection is relatively simple. Once either party sends an interruption instruction, the connection is interrupted. The interruption instruction has a parameter to indicate which connection is interrupted. After transmission operation for the current data is completed, both the second terminal equipment and the first terminal equipment receive an interruption connection event with a connection handle.

Figure 6:
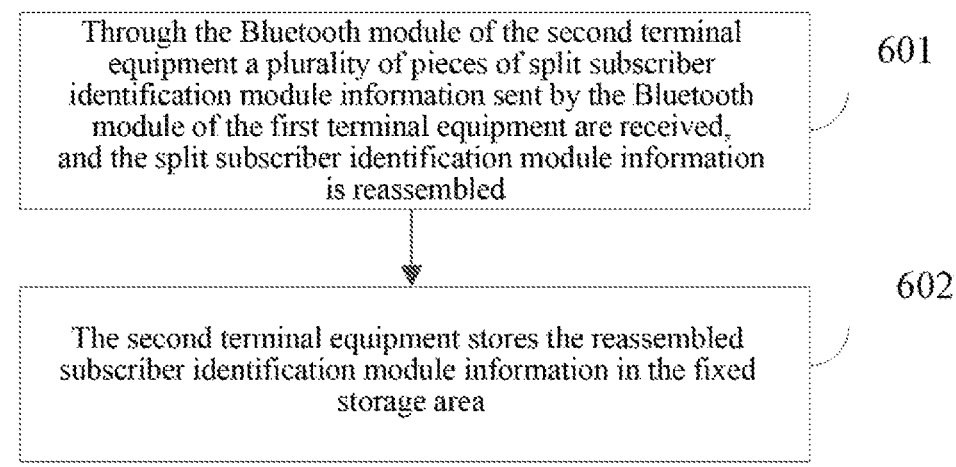
FIG. 6 is a flow chart of receiving subscriber identification module information in the method for realizing a plurality of mobile phones to share one card, applied to the second terminal equipment side, according to an embodiment of the present disclosure.

In the above-mentioned embodiment of the present disclosure, as shown in FIG. 6, the step 600 specifically includes steps 601-602.

In step 601, through the Bluetooth module of the second terminal equipment, a plurality of pieces of split subscriber identification module information sent by the Bluetooth module of the first terminal equipment is received, and the split subscriber identification module information is reassembled.

In step 602, the second terminal equipment stores the reassembled subscriber identification module information in the fixed storage area.

With the technical scheme provided in the embodiments of the present disclosure, after the second terminal equipment stores the reassembled subscriber identification module information in the fixed storage area, the following functions can be realized.

When making a call, any mobile phone may be used to make a call. However, the call records may be set to synchronize, and which mobile phone is used to make the call requires to be noted. When a first mobile phone is making a call, a second mobile phone may be used to make a call simultaneously and at this time enters the call waiting. Of course, it can also set whether the second mobile phone listens to conversation of the first mobile phone with other people. When listening, whether to inform both sides of the conversation may be set.

For answering the phone, when rings, any mobile phone may answer the phone, and whether the two mobile phones can answer the phone simultaneously may be set, or whether there is a priority for polling answer is set. When a second mobile phone listens to the conversation which the first mobile phone is calling, whether to inform both parties for a conversation may be set.

For making a call and answering a call, when a first mobile phone is in a call, other calls made by other phone numbers to call the phone number of the first mobile phone get into call waiting, or is told that the first mobile phone is in a call, that is, a second mobile phone cannot answer a call any longer. Each phone number can only be in a call. But the second mobile phone may set whether to answer the call of the first mobile phone, and whether to inform the both parties for a conversation.

If a user wants to try a third new mobile phone, an operation is the same as the aforementioned operation. If the user wants to cancel the second mobile phone, the user cancels the binding to achieve the aim.

Figure 7:
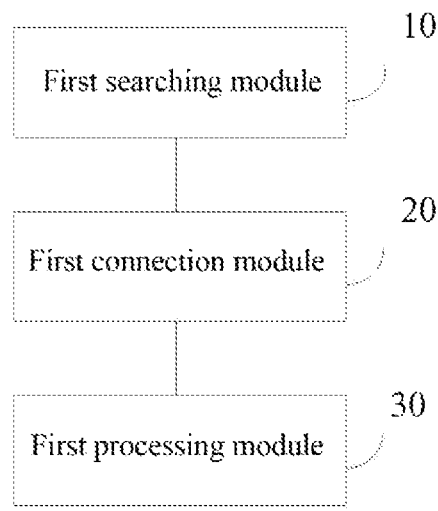
FIG. 7 is a block diagram of an apparatus for realizing a plurality of mobile phones to share one card, applied to a first terminal equipment side, according to an embodiment of the present disclosure.

An embodiment of the present disclosure further provides an apparatus for realizing a plurality of mobile phones to share one card, applied to a first terminal equipment side, and as shown in FIG. 7, the apparatus includes a first searching module 10, a first connection module 20 and a first processing module 30.

The first searching module 10 is configured to, through a Bluetooth module of the first terminal equipment, search for one or more second terminal equipments nearby, or receive information for searching for the first terminal equipment by a Bluetooth module/modules of one or more second terminal equipment.

The first connection module 20 is configured to establish a connection between the Bluetooth module of the first terminal equipment and a Bluetooth module of a second terminal equipment.

The first processing module 30 is configured to send subscriber identification module information of the first terminal equipment to the Bluetooth module of the second terminal equipment through the Bluetooth module of the first terminal equipment, and store the subscriber identification module information in a fixed storage area of the second terminal equipment by the second terminal equipment.

In the above-mentioned embodiment of the present disclosure, the apparatus further includes an acquisition module (not shown in the figure) configured to acquire Bluetooth buffer parameter information of the Bluetooth module of the first terminal equipment.

Figure 8:
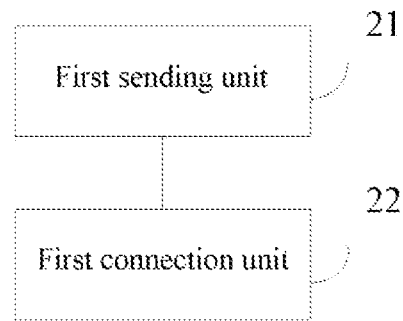
FIG. 8 is a block diagram of a first connection module in the apparatus for realizing a plurality of mobile phones to share one card, applied to the first terminal equipment side, according to an embodiment of the present disclosure.

In the above-mentioned embodiment of the present disclosure, as shown in FIG. 8, the first connection module 20 includes a first sending unit 21 and a first connection unit 22.

The first sending unit 21 is configured to send connection request information to the Bluetooth module of the second terminal equipment through the Bluetooth module of the first terminal equipment, and the connection request information includes connection parameter information, such as a Bluetooth address, an equipment type and a connection mode, of the first terminal equipment.

The first connection unit 22 is configured to, through the Bluetooth module of the second terminal equipment, receive the connection request information and send an instruction, and establish the connection between the Bluetooth module of the first terminal equipment and the Bluetooth module of the second terminal equipment.

Figure 9:
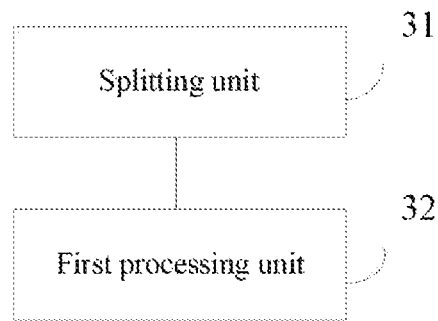
FIG. 9 is a block diagram of a first processing module in the apparatus for realizing a plurality of mobile phones to share one card, applied to the first terminal equipment side, according to an embodiment of the present disclosure.

In the above-mentioned embodiment of the present disclosure, as shown in FIG. 9, the first processing module 30 includes a splitting unit 31 and a first processing unit 32.

The splitting unit 31 is configured to split the subscriber identification module information, which is sent to the Bluetooth module of the second terminal equipment, based on the Bluetooth buffer parameter.

The first processing unit 32 is configured to define the split subscriber identification module information in a Bluetooth data package format, and identify by a data package header, and send the identified subscriber identification module information to the Bluetooth module of the second terminal equipment through the Bluetooth module of the first terminal equipment.

Figure 10:
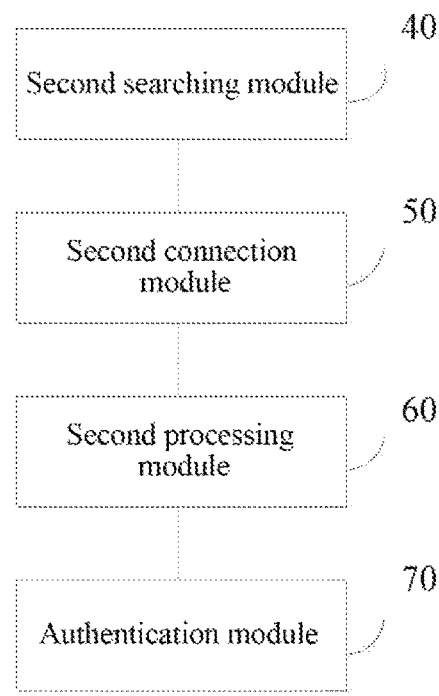
FIG. 10 is a block diagram of an apparatus for realizing a plurality of mobile phones to share one card, applied to a second terminal equipment side, according to an embodiment of the present disclosure.

An embodiment of the present disclosure further provides an apparatus for realizing a plurality of mobile phones to share one card, applied to a second terminal equipment side, and as shown in FIG. 10, the apparatus includes a second searching module 40, a second connection module 50, a second processing module 60 and an authentication module 70.

The second searching module 40 is configured to, through a Bluetooth module of a second terminal equipment, receive searching information sent by a Bluetooth module/modules of one or more first terminal equipments, or search for one or more first terminal equipments nearby.

The second connection module 50 is configured to establish a connection between the Bluetooth module of the second terminal equipment and a Bluetooth module of a first terminal equipment.

The second processing module 60 is configured to receive subscriber identification module information of the first terminal equipment sent by the Bluetooth module of the first terminal equipment through the Bluetooth module of the second terminal equipment, and store the subscriber identification module information in a fixed storage area of the second terminal equipment.

The authentication module 70 is configured to perform a number-card authentication based on the subscriber identification module information stored in the fixed storage area.

Figure 11:
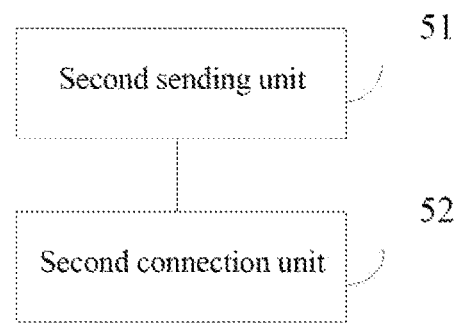
FIG. 11 is a block diagram of a second connection module in the apparatus for realizing a plurality of mobile phones to share one card, applied to the second terminal equipment side, according to an embodiment of the present disclosure.

In the above-mentioned embodiment of the present disclosure, as shown in FIG. 11, the second connection module 50 includes a second sending unit 51 and a second connection unit 52.

The second sending unit 51 is configured to send connection request information to a Bluetooth module of a first terminal equipment through a Bluetooth module of a second terminal equipment, and the connection request information includes connection parameter information, such as a Bluetooth address, an equipment type and a connection mode, of the second terminal equipment.

The second connection unit 52 is configured to, through the Bluetooth module of the second terminal equipment, receive the connection request information and send an instruction, and establish the connection between the Bluetooth module of the second terminal equipment and the Bluetooth module of the first terminal equipment.

Figure 12:
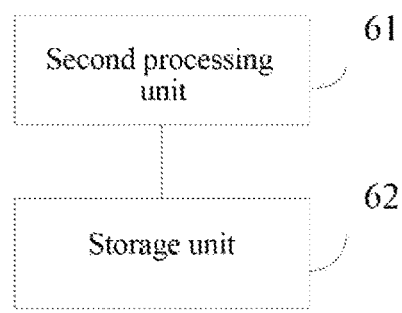
FIG. 12 is a block diagram of a second processing module in the apparatus for realizing a plurality of mobile phones to share one card, applied to the second terminal equipment side, according to an embodiment of the present disclosure.

In the above-mentioned embodiment of the present disclosure, as shown in FIG. 12, the second processing module 60 includes a second processing unit 61 and a storage unit 62.

The second processing unit 61 is configured to receive a plurality of pieces of split subscriber identification module information sent by the Bluetooth module of the first terminal equipment through the Bluetooth module of the second terminal equipment, and reassemble the split subscriber identification module information.

The storage unit 62 is configured to store the reassembled subscriber identification module information in the fixed storage area.

According to a method for realizing a plurality of mobile phones to share one card provided by the embodiments of the present disclosure, through a Bluetooth module of a first terminal equipment, one or more second terminal equipments nearby is/are searched for, or information for searching for the first terminal equipment by one or more second terminal equipments is received, and a connection with the second terminal equipment is established and the subscriber identification module information is sent to the second terminal equipment. Therefore, a plurality of mobile phones to share one card is realized really and the operation is simple, and it is convenient for the replacement for a new terminal equipment, and for user experience. While the operation is easy, there is a higher security also.

It is to be illustrated that the apparatuses for realizing a plurality of mobile phones to share one card provided in the present disclosure is the apparatuses which apply the above-mentioned method, and all embodiments of the method above-mentioned are applicable to the apparatuses and are capable of achieving the same or similar benefits.

The above description is only alternative embodiments of the present disclosure, and it should be pointed out that, for those ordinarily skilled in the art, without departing from the principle of the present disclosure, various improvements and modifications can be made, and these improvements and modifications are within the protection scope of the present disclosure.

INDUSTRIAL APPLICABILITY

The embodiments of the present disclosure propose methods and apparatuses for realizing a plurality of mobile phones to share one card. Herein, the method applied to a first terminal equipment side includes: through a Bluetooth module of a first terminal equipment, one or more second terminal equipments nearby is/are searched for, or information for searching for the first terminal equipment by one or more second terminal equipment is received, a connection between the Bluetooth modules of both of the terminal equipments is established; subscriber identification module information of the first terminal equipment is sent to the Bluetooth module of the second terminal equipment through the Bluetooth module of the first terminal equipment, and the subscriber identification module information is stored in a fixed storage area of the second terminal equipment by the second terminal equipment. By means of binding the searched second terminal equipment with the first terminal equipment by the Bluetooth technology, the subscriber identification module information of the first terminal equipment is transmitted to the second terminal equipment. Therefore, a plurality of mobile phones to share one card is realized really and the operation is simple, and it is convenient for the replacement of a new terminal equipment and an old terminal equipment, and there is a better user experience value.

What we claim is:

1. A method for realizing a plurality of mobile phones to share one card, comprising:
    through a Bluetooth module of a first terminal equipment, searching for one or more second terminal equipments nearby, or receiving information for searching for the first terminal equipment by a Bluetooth module/modules of one or more second terminal equipments;
    establishing a connection between the Bluetooth module of the first terminal equipment and a Bluetooth module of a second terminal equipment;
    acquiring Bluetooth buffer parameter information of the Bluetooth module of the first terminal equipment;
    splitting, by the first terminal equipment, the subscriber identification module information, which is sent to the Bluetooth module of the second terminal equipment, based on the Bluetooth buffer parameter; and
    defining the split subscriber identification module information in a Bluetooth data package format, and identifying by a data package header, and sending the identified subscriber identification module information to the Bluetooth module of the second terminal equipment through the Bluetooth module of the first terminal equipment, and storing the subscriber identification module information in a fixed storage area of the second terminal equipment by the second terminal equipment.

2. The method according to claim 1, wherein, the establishing a connection between the Bluetooth module of the first terminal equipment and a Bluetooth module of a second terminal equipment comprises:
    sending connection request information to the Bluetooth module of the second terminal equipment through the Bluetooth module of the first terminal equipment; wherein, the connection request information comprises connection parameter information, which include a Bluetooth address, an equipment type, and a connection mode, of the first terminal equipment; and
    through the Bluetooth module of the second terminal equipment, receiving the connection request information and sending an instruction, and establishing the connection between the Bluetooth module of the first terminal equipment and the Bluetooth module of the second terminal equipment.

3. A method for realizing a plurality of mobile phones to share one card, comprising:
    through a Bluetooth module of a second terminal equipment, receiving searching information sent by a Bluetooth module/modules of one or more first terminal equipments, or searching for one or more first terminal equipments nearby;
    establishing a connection between the Bluetooth module of the second terminal equipment and a Bluetooth module of a first terminal equipment;
    receiving subscriber identification module information of the first terminal equipment sent by the Bluetooth module of the first terminal equipment through the Bluetooth module of the second terminal equipment, and storing the subscriber identification module information in a fixed storage area of the second terminal equipment; and
    performing, by the second terminal equipment, a number-card authentication based on the subscriber identification module information stored in the fixed storage area;
    where in, the number-card authentication comprising:
        an authentication result SRES and a call encryption key Kc are calculated by using an IMSI and a key Ki stored in the subscriber identification module; if the SRES calculated by the subscriber identification module is the same as an SRES calculated in the network, the authentication is successful.

4. The method according to claim 3, wherein, the establishing a connection between the Bluetooth module of the second terminal equipment and a Bluetooth module of a first terminal equipment comprises:
    sending connection request information to the Bluetooth module of the first terminal equipment through the Bluetooth module of the second terminal equipment; wherein, the connection request information comprises connection parameter information, which includes a Bluetooth address, an equipment type, and a connection mode, of the second terminal equipment; and
    through the Bluetooth module of the first terminal equipment, receiving the connection request information and sending an instruction, and establishing the connection between the Bluetooth module of the second terminal equipment and the Bluetooth module of the first terminal equipment.

5. The method according to claim 3, wherein, the receiving subscriber identification module information of the first terminal equipment sent by the Bluetooth module of the first terminal equipment through the Bluetooth module of the second terminal equipment, and storing the subscriber identification module information in a fixed storage area of the second terminal equipment comprises:
    receiving, by the Bluetooth module of the second terminal equipment, a plurality of pieces of split subscriber identification module information sent by the Bluetooth module of the first terminal equipment, and reassembling the split subscriber identification module information; and
    storing, by the second terminal equipment, the reassembled subscriber identification module information in the fixed storage area.

6. An apparatus for realizing a plurality of mobile phones to share one card, applied to a first terminal equipment side, the apparatus comprising:
    a first searching module configured to, through a Bluetooth module of a first terminal equipment, search for one or more second terminal equipments nearby, or receive information for searching for the first terminal equipment by a Blue module/modules of one or more second terminal equipments;

a first connection module configured to establish a connection between the Bluetooth module of the first terminal equipment and a Bluetooth module of a second terminal equipment;

an acquisition module configured to acquire Bluetooth buffer parameter information of the Bluetooth module of the first terminal equipment;

a first processing module configured to send subscriber identification module information of the first terminal equipment to the Bluetooth module of the second terminal equipment through the Bluetooth module of the first terminal equipment, and store the subscriber identification module information in a fixed storage area of the second terminal equipment by the second terminal equipment;

where in, the first processing module comprises:
    a splitting unit configured to split the subscriber identification module information, which is sent to the Bluetooth module of the second terminal equipment, based on the Bluetooth buffer parameter; and
    a first processing unit configured to define the split subscriber identification module information in a Bluetooth data package format, and identify by a data package header, and send the identified subscriber identification module information to the Bluetooth module of the second terminal equipment through the Bluetooth module of the first terminal equipment.

7. The apparatus according to claim 6, wherein, the first connection module comprises:
    a first sending unit configured to send connection request information to the Bluetooth module of the second terminal equipment through the Bluetooth module of the first terminal equipment, wherein the connection request information comprises connection parameter information, which include a Bluetooth address, an equipment type and a connection mode, of the first terminal equipment; and
    a first connection unit configured to, through the Bluetooth module of the second terminal equipment, receive the connection request information and send an instruction, and establish the connection between the Bluetooth module of the first terminal equipment and the Bluetooth module of the second terminal equipment.

8. An apparatus for realizing a plurality of mobile phones to share one card, which is applied to a second terminal equipment side and where the method according to claim 3 is implemented, the apparatus comprising:
    a second searching module configured to, through a Bluetooth module of a second terminal equipment, receive searching information sent by a Bluetooth module/modules of one or more first terminal equipments, or search for one or more first terminal equipments nearby;
    a second connection module configured to establish a connection between the Bluetooth module of the second terminal equipment and a Bluetooth module of a first terminal equipment;
    a second processing module configured to receive subscriber identification module information of the first terminal equipment sent by the Bluetooth module of the first terminal equipment through the Bluetooth module of the second terminal equipment, and store the subscriber identification module information in a fixed storage area of the second terminal equipment; and
    an authentication module configured to perform a number-card authentication based on the subscriber identification module information stored in the fixed storage area;

where in, the number-card authentication comprising:
    an authentication result SRES and a call encryption key Kc are calculated by using an IMSI and a key Ki stored in the subscriber identification module; if the SRES calculated by the subscriber identification module is the same as an SRES calculated in the network, the authentication is successful.

9. The apparatus according to claim 8, wherein, the second connection module comprises:
    a second sending unit configured to send connection request information to the Bluetooth module of the first terminal equipment through the Bluetooth module of the second terminal equipment, wherein the connection request information comprises connection parameter information, which include a Bluetooth address, an equipment type and a connection mode, of the second terminal equipment; and
    a second connection unit configured to, through the Bluetooth module of the first terminal equipment, receive the connection request information and send an instruction, and establish the connection between the Bluetooth module of the second terminal equipment and the Bluetooth module of the first terminal equipment.

10. The apparatus according to claim 8, wherein, the second processing module comprises:
    a second processing unit configured to receive a plurality of pieces of split subscriber identification module information sent by the Bluetooth module of the first terminal equipment through the Bluetooth module of the second terminal equipment, and reassemble the split subscriber identification module information; and
    a storage unit configured to store the reassembled subscriber identification module information in the fixed storage area.

* * * * *